United States Patent
Lee

(10) Patent No.: US 11,557,286 B2
(45) Date of Patent: Jan. 17, 2023

(54) SPEECH RECOGNITION METHOD AND APPARATUS

(71) Applicant: Samsung Electronics Co., Ltd., Suwon-si (KR)

(72) Inventor: Jihyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 16/729,771

(22) Filed: Dec. 30, 2019

(65) Prior Publication Data

US 2021/0043196 A1 Feb. 11, 2021

(30) Foreign Application Priority Data

Aug. 5, 2019 (KR) .................. 10-2019-0094950

(51) Int. Cl.
*G10L 15/187* (2013.01)
*G10L 15/02* (2006.01)
*G10L 15/22* (2006.01)

(52) U.S. Cl.
CPC ............ *G10L 15/187* (2013.01); *G10L 15/02* (2013.01); *G10L 15/22* (2013.01); *G10L 2015/025* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,454,957 B1* | 9/2016 | Mathias | G06F 40/295 |
| 2014/0358544 A1* | 12/2014 | Printz | G10L 15/32 |
| | | | 704/254 |
| 2014/0379335 A1* | 12/2014 | Han | G10L 15/26 |
| | | | 704/235 |
| 2015/0058005 A1* | 2/2015 | Khare | G10L 15/063 |
| | | | 704/235 |
| 2015/0058006 A1* | 2/2015 | Proux | G10L 15/26 |
| | | | 704/235 |
| 2015/0371632 A1* | 12/2015 | Skobeltsyn | G10L 15/1815 |
| | | | 704/251 |

(Continued)

FOREIGN PATENT DOCUMENTS

| | | |
|---|---|---|
| EP | 2 963 643 A3 | 1/2016 |
| EP | 3 029 669 A1 | 6/2016 |

(Continued)

OTHER PUBLICATIONS

Extended European Search Report dated Oct. 5, 2020, in counterpart European Patent Application No. 20168823.1 (1 page in English).

*Primary Examiner* — Jonathan C Kim
(74) *Attorney, Agent, or Firm* — NSIP Law

(57) ABSTRACT

A speech recognition method includes receiving speech data, obtaining, from the received speech data, a candidate text including at least one word and a phonetic symbol sequence associated with a pronunciation of a target word included in the received speech data, using a speech recognition model, replacing the phonetic symbol sequence included in the candidate text with a replacement word corresponding to the phonetic symbol sequence, and determining a target text corresponding to the received speech data based on a result of the replacing.

19 Claims, 10 Drawing Sheets

(56) References Cited

U.S. PATENT DOCUMENTS

| | | | |
|---|---|---|---|
| 2016/0155436 A1* | 6/2016 | Choi | G10L 15/32 |
| | | | 704/232 |
| 2016/0314783 A1 | 10/2016 | Zhang | |
| 2016/0342682 A1 | 11/2016 | Moreno Mengibar et al. | |
| 2017/0013301 A1 | 5/2017 | Printz | |
| 2017/0133010 A1* | 5/2017 | Printz | G10L 15/1815 |
| 2017/0229124 A1 | 8/2017 | Strohman et al. | |
| 2017/0287474 A1* | 10/2017 | Maergner | G06F 40/211 |
| 2018/0068661 A1* | 3/2018 | Printz | G06F 40/295 |
| 2018/0144749 A1 | 5/2018 | Choi et al. | |
| 2020/0160838 A1* | 5/2020 | Lee | G10L 15/26 |
| 2021/0034662 A1* | 2/2021 | Aher | G10L 15/1807 |
| 2021/0043196 A1* | 2/2021 | Lee | G10L 15/02 |
| 2021/0118446 A1* | 4/2021 | Lee | G10L 15/16 |
| 2021/0151042 A1* | 5/2021 | Park | G10L 15/197 |

FOREIGN PATENT DOCUMENTS

| | | |
|---|---|---|
| JP | 2004-198831 A | 7/2004 |
| JP | 2013-125144 A | 6/2013 |
| JP | 2015-014774 A | 1/2015 |
| JP | 2017-097062 A | 6/2017 |
| JP | 2019-015950 A | 1/2019 |
| KR | 10-2009-0065102 A | 6/2009 |
| KR | 10-2011-0071742 A | 6/2011 |
| KR | 10-2013-0068621 A | 6/2013 |
| KR | 10-2013-0128329 A | 11/2013 |
| KR | 10-1729522 B1 | 4/2017 |
| KR | 10-2017-0106951 A | 9/2017 |
| KR | 10-2018-0038707 A | 4/2018 |

\* cited by examiner

FIG. 8

| Word | Phonetic symbol sequence |
|---|---|
| APPLE | AE1 P AH0 L |
| APPLEBANANA | AE1 P AH0 L B AH0 N AE1 N AH0 |
| APPLEBAUM | AE1 P AH0 L B AW2 M |
| .... | .... |
| MARK | M AA1 R K |
| .... | .... |
| ZBRA | Z B R AH0 |

SPEECH RECOGNITION METHOD AND APPARATUS

CROSS-REFERENCE TO RELATED APPLICATIONS

This application claims the benefit under 35 USC 119(a) of Korean Patent Application No. 10-2019-0094950 filed on Aug. 5, 2019, in the Korean Intellectual Property Office, the entire disclosure of which is incorporated herein by reference for all purposes.

BACKGROUND

1. Field

The following description relates to a speech recognition method and apparatus.

2. Description of Related Art

Speech recognition refers to technology by which a computer analyzes a speech sound uttered by a human being for communication and converts the speech sound to a text data. The technology is being developed rapidly by a growing demand from users who pursue convenience. There is ongoing research on methods of performing speech recognition using a neural network. The neural network may be a model that emulates a characteristic of a biological nerve cell of a human being by a mathematical representation, and uses an algorithm that emulates a learning ability of a human being. The neural network may have a generalization ability to generate a relatively correct output for an input pattern that has not been used for learning or training, based on a result of learning or training. Thus, due to such generalization ability, it is widely used in technical fields of speech recognition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a speech recognition method includes receiving speech data, obtaining, from the received speech data, a candidate text including at least one word and a phonetic symbol sequence associated with a pronunciation of a target word included in the received speech data, using a speech recognition model, replacing the phonetic symbol sequence included in the candidate text with a replacement word corresponding to the phonetic symbol sequence, and determining a target text corresponding to the received speech data based on a result of the replacing.

The at least one word may include at least one subword, and the candidate text may include the at least one subword, the phonetic symbol sequence, and an identifier pair indicating a start and an end of the phonetic symbol sequence.

The replacing may include replacing, with the replacement word, the phonetic symbol sequence identified by the identifier pair.

The identifier pair may indicate a category of the target word associated with the phonetic symbol sequence.

The method may include determining the replacement word corresponding to the phonetic symbol sequence using dictionary data including information associated with a plurality of words and phonetic symbol sequences respectively corresponding to the words.

The method may include calculating a similarity between the phonetic symbol sequence included in the candidate text and each of the phonetic symbol sequences included in the dictionary data, and determining, as the replacement word corresponding to the phonetic symbol sequence included in the candidate text, a word corresponding to a phonetic symbol sequence having a greatest similarity among calculated similarities of the phonetic symbol sequences included in the dictionary data.

The dictionary data may be of a trie or hashmap data structure, and the determining may include retrieving a phonetic symbol sequence corresponding to the phonetic symbol sequence included in the candidate text from the phonetic symbol sequences included in the dictionary data, using the data structure, and determining a word corresponding to the retrieved phonetic symbol sequence to be the replacement word corresponding to the phonetic symbol sequence in the candidate text.

The method may include determining the replacement word corresponding to the phonetic symbol sequence included in the candidate text, using dictionary data corresponding to the category indicated by the identifier pair among sets of dictionary data corresponding to different categories; and replacing the phonetic symbol sequence included in the candidate text with the determined replacement word. Each of the sets of dictionary data corresponding to the different categories may include information associated with a phonetic symbol sequence corresponding to each of words in each of the categories.

In response to the phonetic symbol sequence corresponding to a plurality of words, the method may include obtaining a plurality of candidate target texts by replacing the phonetic symbol sequence with each of the words; calculating a score of each of the candidate target texts using a language model; and determining, to be the target text, a candidate target text having a greatest score among calculated scores of the candidate target texts.

The phonetic symbol sequence may be associated with a pronunciation of the target word corresponding to a proper noun.

In another general aspect, a speech recognition apparatus includes at least one processor. The at least one processor may receive speech data, obtain, from the received speech data, a candidate text including at least one word and a phonetic symbol sequence associated with a pronunciation of a target word included in the received speech data, using a speech recognition model, replace the phonetic symbol sequence included in the candidate text with a replacement word corresponding to the phonetic symbol sequence, and determine a target text corresponding to the received speech data based on a result of the replacing.

The processor may replace, with the replacement word, the phonetic symbol sequence to be identified by an identifier pair.

The processor may determine the replacement word corresponding to the phonetic symbol sequence using dictionary data corresponding to a category indicated by the identifier pair among sets of dictionary data respectively corresponding to different categories, and replace the phonetic symbol sequence included in the candidate text with the determined replacement word.

In response to the phonetic symbol sequence corresponding to a plurality of words, the processor may obtain a plurality of candidate target texts by replacing the phonetic symbol sequence with each of the words, calculate a score of each of the candidate target texts using a language model, and determine, to be the target text, a candidate target text having a greatest score among calculated scores of the candidate target texts.

The speech recognition model may include an encoder configured to extract a vector value from the speech data, and a decoder configured to output the candidate text corresponding to the speech data from the vector value.

The phonetic symbol sequence may be associated with a pronunciation of a word corresponding to a proper noun.

In another general aspect, a speech recognition method includes receiving speech data; obtaining, from the received speech data, a target phonetic symbol sequence that represents a pronunciation of a target word included in the received speech data and an identifier pair that identifies a category of the target word; comparing the target phonetic symbol sequence with one or more other phonetic symbol sequences, based on the category of the target word, each of the other phonetic symbol sequences being associated with a respective replacement word; and outputting a target text corresponding to the received speech data by replacing the target word with one of the replacement words, based on the comparing.

The method may include determining the replacement word to replace the target word as one of the respective replacements words that is associated with one of the other phonetic symbol sequences that is most similar to the target phonetic symbol sequence.

The target phonetic symbol sequence may be included in candidate text that includes at least at least one subword that precedes or follows the target phonetic symbol sequence.

The identifier pair may include a first character that indicates a start of the target phonetic symbol sequence and a second character that that indicates a start of the target phonetic symbol sequence, and the at least one subword may be separated from the target phonetic symbol sequence in the candidate text by one or both of the first character and the second character.

Other features and aspects will be apparent from the following detailed description, the drawings, and the claims.

BRIEF DESCRIPTION OF THE DRAWINGS

FIG. 8 illustrates an example of dictionary data of a word and a phonetic symbol sequence.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
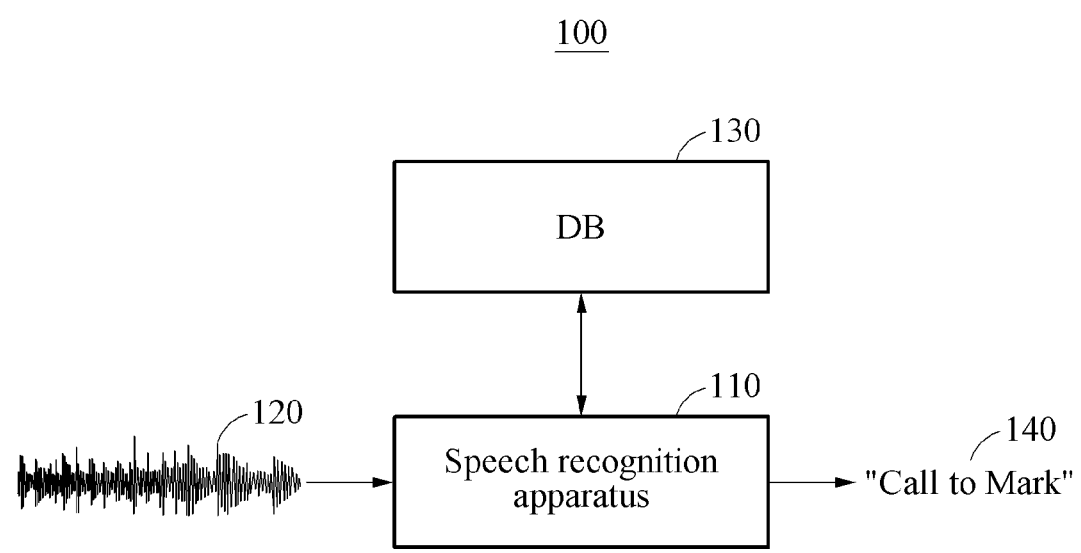
FIG. 1 illustrates an example of a speech recognition system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of a speech recognition system.

Referring to FIG. 1, a speech recognition system 100 may be implemented in at least one computer or terminal including a server. In an example, a user may give a command to the speech recognition system 100 through a speech input 120. In this example, the speech input 120 may include a sequence of words, or a word sequence as used herein, and each word sequence may include a word, a subword, a phrase, or a sentence.

In the example of FIG. 1, the speech recognition system 100 estimates a text 140 corresponding to the speech input 120 by analyzing the speech input 120 of the user. The speech recognition system 100 extracts, from the estimated text 140, the command of the user included in the text 140, and provides the user with a result of executing the extracted command. For example, when the text 140 corresponding to the speech input 120 is recognized as "call to Mark" as illustrated, the speech recognition system 100 retrieves a contact number of Mark from a contact number database (DB), and performs a function of making a call to the retrieved contact number of Mark. The speech recognition system 100 may also be used for other various applications such as machine translation and human-machine dialogue, in addition to recognition of a command included in a speech input of a user as described above.

The speech recognition system 100 includes a speech recognition apparatus 110 that is programmed to receive the speech input 120 from the user and convert the received speech input 120 to the text 140 corresponding to the speech input 120. The speech recognition apparatus 110 recognizes the speech input 120, and generates text data corresponding to the speech input 120. The speech recognition apparatus 110 may be embodied by a software module, a hardware module, or a combination thereof that is configured to convert words included in the speech input 120 to the text 140. The speech recognition apparatus 110 may be embedded in or interwork with, for example, a mobile phone, a cellular phone, a smartphone, a personal computer (PC), a laptop, a netbook, a tablet PC, a personal digital assistant (PDA), a digital camera, a game console, an MP3 player, a personal multimedia player (PMP), an e-book, a navigation system, a disk player, a set-top box, a home appliance, and other electronic devices or apparatuses. In addition, the speech recognition apparatus 110 may be embedded in or interwork with, for example, a smart home appliance, an intelligent vehicle, a smart home environment, a smart building environment, a smart office environment, a smart electronic security system, a wearable device worn on a user, and the like.

The speech recognition apparatus 110 may use a language model (LM) stored in a DB 130 to improve accuracy of a speech recognition result. The LM may be a component included in a natural language processing engine that may perform a function of allowing a recognition result of a received speech input to be a natural language representation. The LM may provide a probability value associated with a word including a subword, a phrase, and/or a sentence, and the speech recognition apparatus 110 may determine a speech recognition result based on text representations provided by the LM and probability values of the text representations. A single LM or a plurality of LMs may be used for speech recognition. An LM used for speech recognition may include, for example, a general LM independent from a domain of a speech input, an LM trained with a corpus including speech expressions frequently used for each domain, and a personalized LM (PLM) that is personalized based on user information, or information including, for example, contact numbers, that is stored in a user terminal such as a smartphone.

The speech recognition apparatus 110 converts, to a phonetic symbol sequence, a portion in the speech input 120 corresponding to a word that is not readily and explicitly recognized, and replaces the phonetic symbol sequence with a corresponding word using dictionary data stored in the DB 130, and then determines a final text. The dictionary data may include information associated with a plurality of words and phonetic symbol sequences respectively corresponding to the words. A phonetic symbol sequence may indicate a sequence of phonetic symbols indicating a pronunciation of a word, and may also be referred to as a phone sequence. Through speech recognition using such phonetic symbol sequence, the speech recognition apparatus 110 may improve a speech recognition rate for a proper noun such as a name of a person and a point of interest (POI) (e.g., a name of a region, a name of a place, and the like).

The DB 130 may be included in the speech recognition apparatus 110, or provided outside the speech recognition apparatus 110. For example, the DB 130 may be included in a server (not shown) configured to communicate with the speech recognition apparatus 110.

Hereinafter, speech recognition to be performed by the speech recognition apparatus 110 will be described in more detail.

Figure 2:
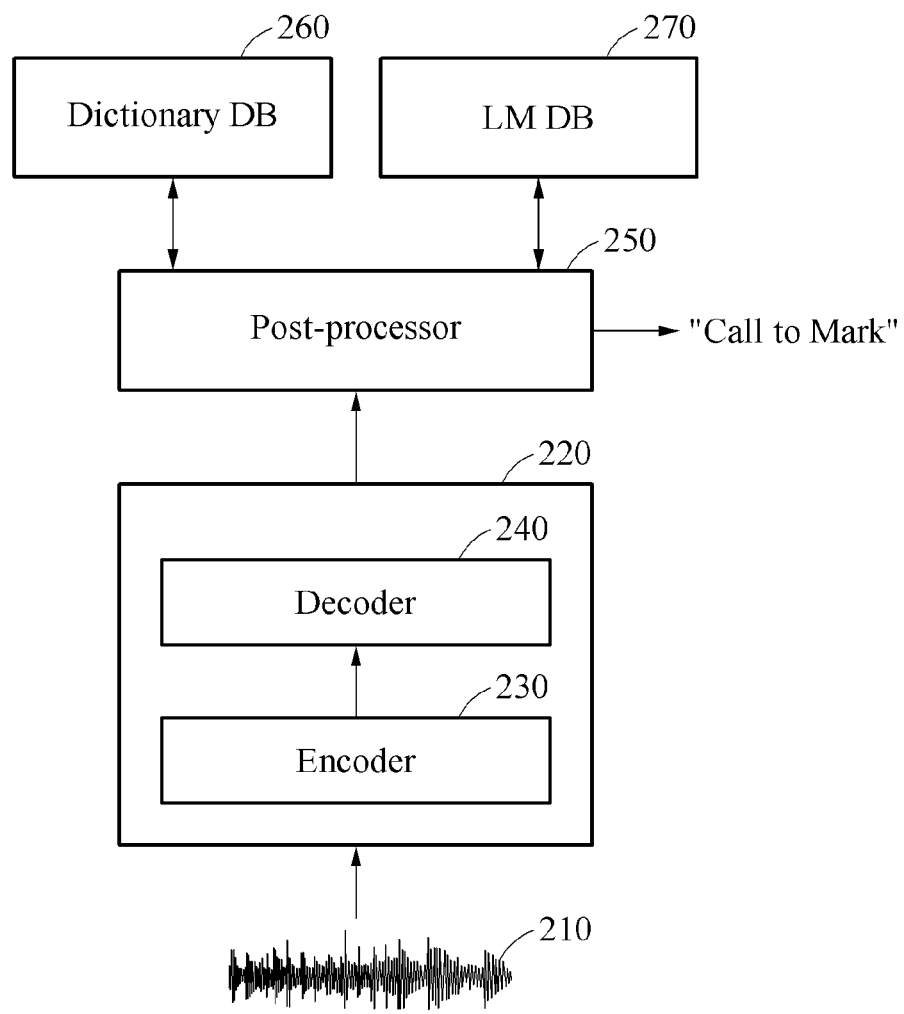
FIG. 2 illustrates an example of an operation of a speech recognition apparatus.

FIG. 2 illustrates an example of an operation of a speech recognition apparatus.

Referring to FIG. 2, a speech recognition apparatus includes a candidate text determiner 220 configured to determine a candidate text corresponding to a speech input (or speech data) 210, and a post-processor 250 configured to post-process the candidate text.

The candidate text determiner 220 determines a candidate text using an encoder-decoder based speech recognition model, for example, a speech recognition engine. The speech recognition model may be, for example, an end-to-end automatic speech recognition (E2E ASR) model configured to generate a candidate text corresponding to the speech input 210 using the speech input 210 as an input.

The speech recognition model includes an encoder 230 configured to extract a feature value, or a feature vector, from the speech input 210, and a decoder 240 configured to output a candidate text based on the feature value extracted by the encoder 230. The encoder 230 and the decoder 240 may be embodied by a single neural network, or based on separate neural networks.

The encoder 230 converts the speech input 210 to an abstract feature vector, and the decoder 240 determines a candidate text based on the abstract feature vector. For example, the encoder 230 receives the speech input 210 in a way data form, and generates a vector value connoting information of the speech input 210. In this example, the decoder 240 receives the vector value from the encoder 230 and generates a candidate text corresponding to the received vector value.

The candidate text to be output from the decoder 240 may include at least one word including a subword, a phonetic symbol sequence associated with a pronunciation of a word, or a combination thereof, according to an example. The candidate text to be output from the decoder 240 may be fundamentally represented by a subword unit. The candidate text may further include an identifier pair to identify a phonetic symbol sequence. A word to be described hereinafter may include a subword which is a smaller unit than a word, unless otherwise defined. A word may consist of a combination of semantic subwords. A subword may be, for example, a piece of a word, a segment of a word segmented by a byte pair encoding (BPE) algorithm, a character, and the like.

The identifier pair may include a start tag and an end tag to identify a portion in the candidate text that corresponds to the phonetic symbol sequence. In the candidate text, the start tag may be positioned immediately before the phonetic symbol sequence, and the end tag may be positioned immediately after the phonetic symbol sequence. The start tag and the end tag may also be referred to as a start token and an end token, respectively.

The identifier pair may explicitly identify a category or a type of a word corresponding to the phonetic symbol sequence. For example, a category of a word corresponding to the phonetic symbol sequence may be identified by a character or a symbol indicated by the identifier pair.

In an example, the decoder 240 determines the candidate text by repeatedly performing a process of sequentially estimating words included in an entire text corresponding to the speech input 210. For example, the decoder 240 estimates a word at a current point in time based on the feature value received from the encoder 230 and a word determined at a previous point in time. In this example, a phonetic symbol sequence may be estimated in lieu of the word.

The speech recognition model including the encoder 230 and the decoder 240 may be trained in advance based on training data including a speech signal and a text corresponding to the speech signal. During the training, the decoder 240 may be trained to output a phonetic symbol sequence for a feature value that does not have a matching word. For example, there may be an utterance or a speech, or an uttered expression, for example, a proper noun, that is not learned or trained, or fully learned or trained, during such a training process, and thus accuracy in recognizing such utterance or speech, for example, a proper noun, may be relatively low in an actual application. However, the decoder 240 may output a phonetic symbol sequence for such an expression that is not fully learned or trained in the training process. In addition, in a post-processing process performed by the post-processor 250, a word matching the phonetic symbol sequence may be more accurately determined using word-phonetic symbol sequence dictionary data, and it is thus possible to improve the accuracy in speech recognition. Thus, utterances or expressions that are not fully learned or trained in the training process may be more accurately recognized.

The post-processor 250 receives, as an input, the candidate text output from the candidate text determiner 220 (decoder 240), and replaces the phonetic symbol sequence in the candidate text with a corresponding word. The post-processor 250 replaces the phonetic symbol sequence in the candidate text with the word corresponding to the phonetic symbol sequence, using dictionary data including information associated with a plurality of words and a phonetic symbol sequence corresponding to each of the words. The dictionary data may be stored in a dictionary DB 260 in which dictionary data for one or more categories or types may be present. In the dictionary data, a single word may be defined to correspond to a single phonetic symbol sequence or a plurality of phonetic symbol sequences, and a single phonetic symbol sequence may be defined to correspond to a single word or a plurality of words.

For example, in response to the phonetic symbol sequence included in the candidate text corresponding to a plurality of words, the post-processor 250 generates a plurality of candidate target texts by replacing the phonetic symbol sequence with each of the words. Subsequently, the post-processor 250 determines a score of each of the candidate target texts using an LM stored in an LM DB 270. The score may indicate information associated with a probability of each of the candidate target texts corresponding to a desired target text. For example, the post-processor 250 may calculate respective scores of the candidate target texts through N-best rescoring using a basic LM or an external LM. The post-processor 250 then determines a final target text based on the calculated scores of the candidate target texts. For example, the post-processor 250 determines (and can output) a candidate target text having a greatest score among the calculated scores of the candidate target texts to be the target text which is a final speech recognition result.

Through such speech recognition described above, the speech recognition apparatus may improve overall performance in speech recognition by more accurately recognizing a speech input including a word that is not learned or trained, or not fully learned or trained, in a training process, for example, a newly-coined word, in addition to a speech input including a proper noun.

The LM DB 270 may include data associated with an LM to be used in the speech recognition process. The LM may be based on, for example, a neural network, n-gram or a word/character string list, and the like, and provide various uttered expressions that are represented by a speech input. The LM may be present as a plurality of LMs. For example, the LM may include an LM specified for a certain domain.

Figure 3:
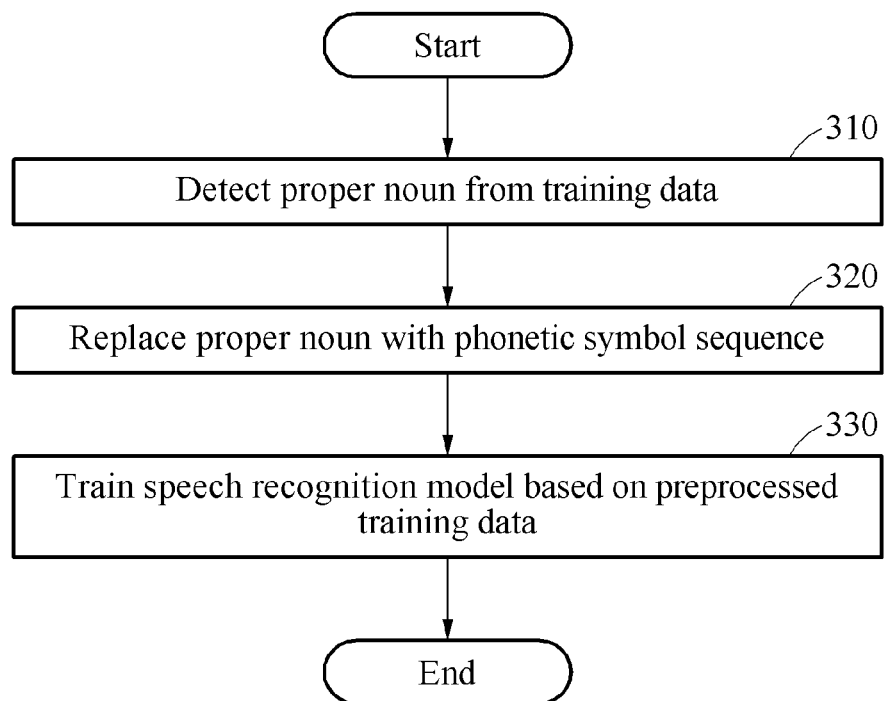
FIG. 3 illustrates a flowchart of an example of training a speech recognition model.

FIG. 3 illustrates a flowchart of an example of training a speech recognition model. The training of the speech recognition model may be performed by a training apparatus.

Referring to FIG. 3, in operation 310, the training apparatus detects a proper noun from training data. For example, the training apparatus detects a proper noun, for example, a human name and a point of interest (POI), from transcriptions of the training data. To detect a proper noun, a named entity recognition algorithm, or a dictionary including information associated with human names or POIs may be used.

In operation 320, the training apparatus replaces the proper noun detected in operation 310 with a corresponding phonetic symbol sequence. The training apparatus performs the replacing, using dictionary data including information associated with a plurality of words and phonetic symbol sequences respectively corresponding to the words. In an example, the training apparatus allocates, to the training data, an identifier pair used to identify a phonetic symbol sequence. The training apparatus allocates, to the training data, a start tag and an end tag based on a category or a type of the detected proper noun. The start tag is allocated immediately before the phonetic symbol sequence, and the end tag is allocated immediately after the phonetic symbol sequence.

For example, when the detected proper noun is a human name, for example, "Mark," a phonetic symbol sequence to which a start tag and an end tag are allocated is represented as "<N>M AA1 R K</N>" in which <N> indicates the start tag and <IN> indicates the end tag, and N is an index indicating that "M AA1 R K" is the phonetic symbol sequence for the human name.

For another example, when the detected proper noun is a POI, for example, Applebees, a phonetic symbol sequence to which a start tag and an end tag are allocated is represented as "<P>AE1 P AH0 L B IY2 Z</P>" in which <P> indicates the start tag and <IP> indicates the end tag, and P is an index indicating that "AE1 P AH0 L B IY2 Z" is the phonetic symbol sequence for the POI.

In an example, when a proper noun to be replaced with a corresponding phonetic symbol sequence has a plurality of phonetic symbol sequences, the training apparatus generates a plurality of sets of training data by replacing the proper noun with each of the phonetic symbol sequences. This example will be described in greater detail with reference to FIG. 4. All the generated sets of training data may be used in a training process.

As described above, in an example, the training apparatus replaces, with a corresponding phonetic symbol sequence, a portion corresponding to a proper noun in training data, and performs preprocessing to add an identifier pair to identify the phonetic symbol sequence, in operations 310 and 320. In another example, operations 310 and 320 may also be applicable to a rare word which is rarely or not frequently used in addition to a proper noun, and the training apparatus may replace the rare word with a corresponding phonetic symbol sequence.

In operation 330, the training apparatus trains a speech recognition model based on preprocessed training data. The training apparatus performs preprocessing on a transcription of a speech corresponding to the training data as described above in operations 310 and 320, and trains the speech recognition model based on a result of the preprocessing. The speech recognition model may be, for example, the encoder-decoder based speech recognition model described above with reference to FIG. 2. When the speech corresponding to the training data is input, the speech recognition model may output a result including a phonetic symbol sequence corresponding to a proper noun in the speech and an identifier pair used to identify the phonetic symbol sequence. The training apparatus may adjust parameters of the speech recognition model to reduce a difference between the result output from the speech recognition model and the result derived from the preprocessing in operations 310 and 320 (e.g., result of replacing, with a phonetic symbol sequence, a portion corresponding to a proper noun in a transcription of training data, and of adding an identifier pair to identify the phonetic symbol sequence). For example, when training data of a speech form is input to the speech recognition model, the training apparatus may adjust parameters of the speech recognition model such that a result output from the speech recognition model and a result obtained through the preprocessing in operations 310 and 320 are the same.

Thus, although, in actual speech recognition, an uttered expression that is not learned or trained, or not fully learned or trained, in a training process, is input to the speech recognition model, the speech recognition model may be trained to output the expression as a learned transcription in which a phonetic symbol sequence and an identifier pair are represented. The training apparatus may generate such a speech recognition model that performs a desired function by repeatedly performing operations 310 through 330 on each of numerous sets of training data.

Figure 4:
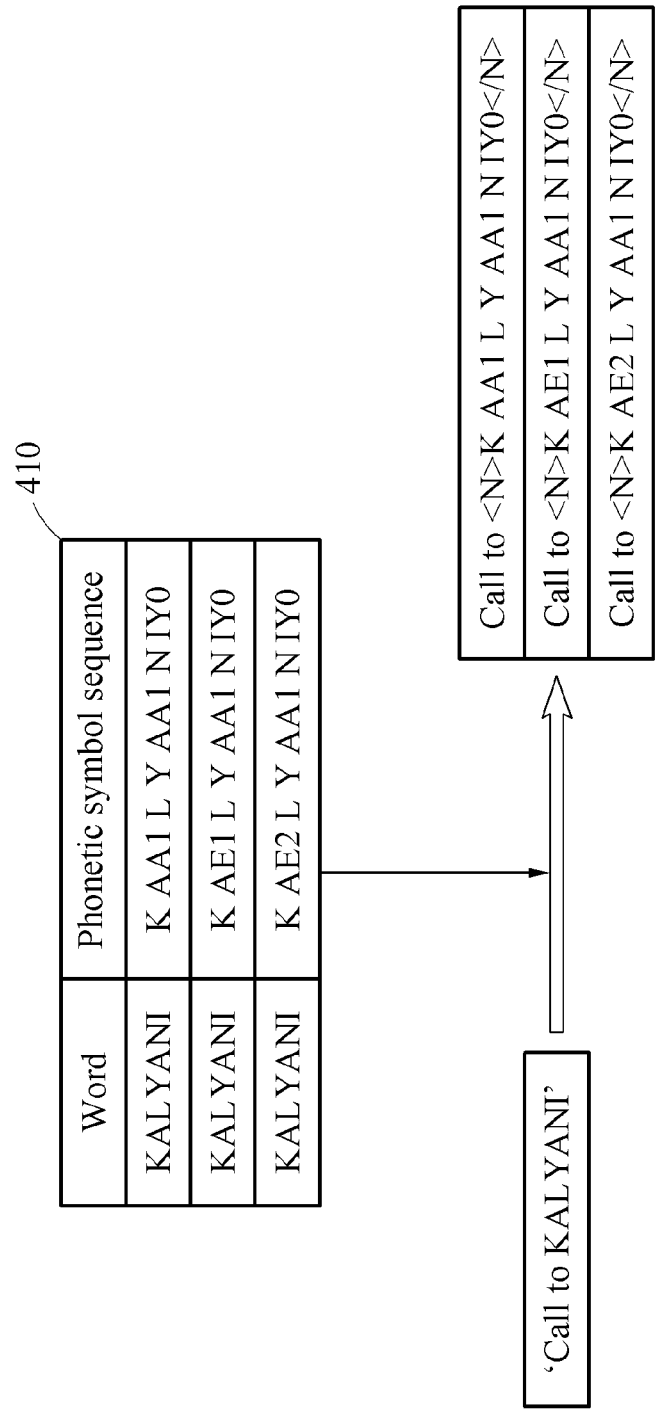
FIG. 4 illustrates an example of preprocessing training data.

FIG. 4 illustrates an example of preprocessing training data.

Referring to FIG. 4, when training data is "Call to KALYANI," a training apparatus detects a human name "KALYANI" as a proper noun from the training data "Call to KALYANI." Subsequently, the training apparatus replaces "KALYANI" detected from the training data with a corresponding phonetic symbol sequence, using dictionary data 410 that defines a word and a corresponding phonetic symbol sequence.

Based on a type or method of pronouncing a word, there may be one or more phonetic symbol sequences corresponding to the word, and information associated with a corresponding relationship between the word and the corresponding phonetic symbol sequences may be defined in the dictionary data 410. For example, when a proper noun to be replaced with a phonetic symbol sequence has a plurality of phonetic symbol sequences in the dictionary data 410, the training apparatus generates a plurality of sets of training data by replacing the proper noun with each of the phonetic symbol sequences. For example, when there are three phonetic symbol sequences corresponding to "KALYANI" as illustrated in FIG. 4, the training apparatus generates three sets of training data by replacing "KALYANI" with each of the three phonetic symbol sequences. Since "KALYANI" is a human name, the training apparatus allocates an identifier pair <N>, <IN> corresponding to the human name to positions before and after each of the phonetic symbol sequences. The identifier pair <N>, <IN> indicates tags of a unique form.

Figure 5:
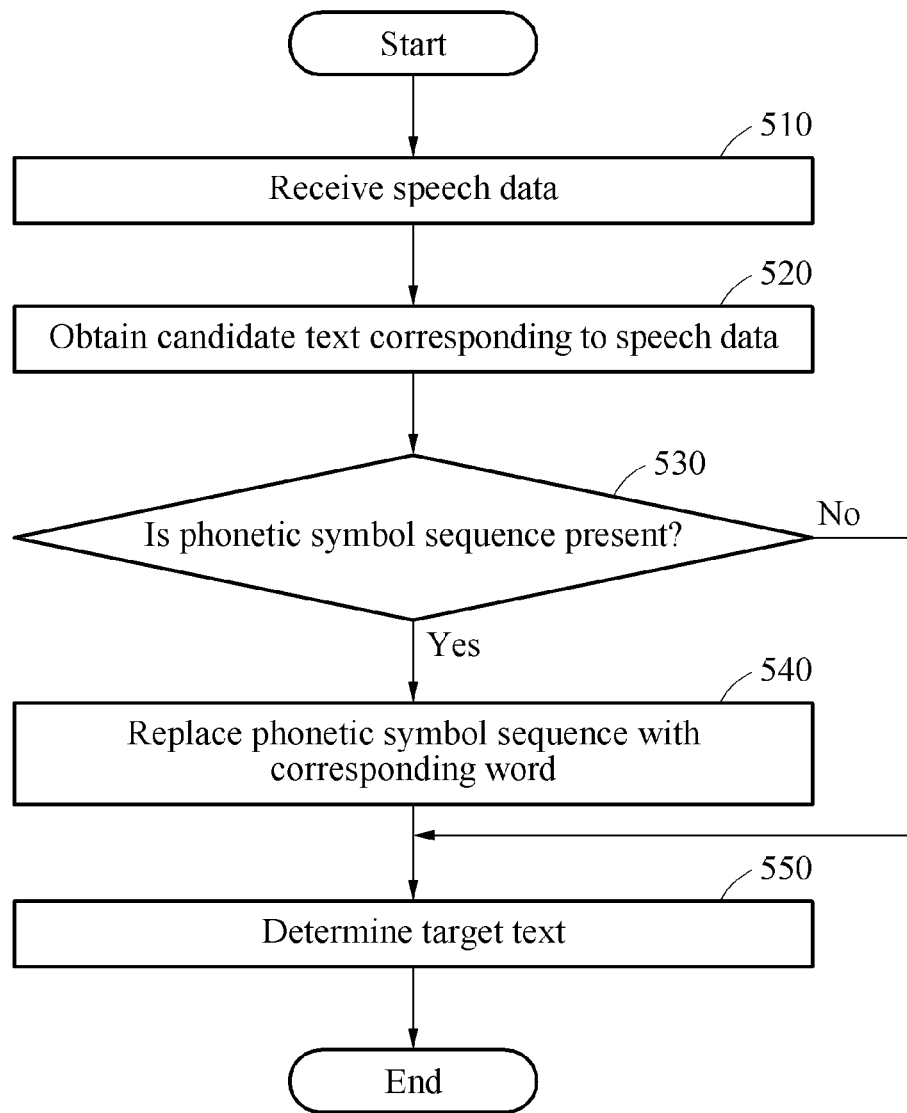
FIGS. 5 and 6 illustrate flowcharts illustrating examples of a speech recognition method.
Figure 6:
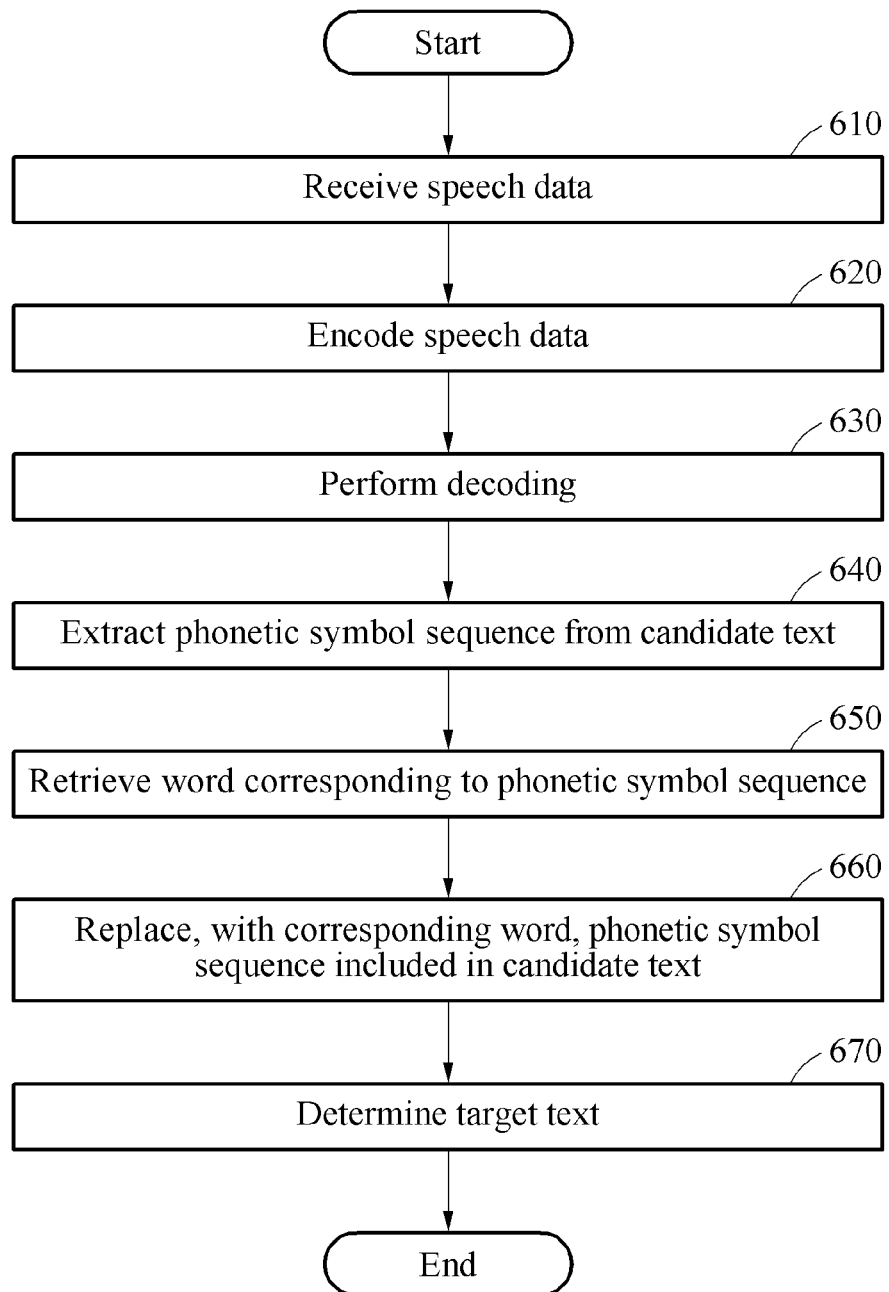

FIGS. 5 and 6 illustrate flowcharts illustrating examples of a speech recognition method. The speech recognition method to be described hereinafter may be performed by a speech recognition apparatus described herein.

Referring to FIG. 5, in operation 510, the speech recognition apparatus receives speech data. A user may input a speech through a speech interface such as a microphone to input a speech command or a speech input, and speech data of the input speech may be transferred to the speech recognition apparatus.

In operation 520, the speech recognition apparatus obtains a candidate text corresponding to the speech data using a speech recognition model. For example, the speech recognition apparatus uses an encoder-decoder based speech recognition model including an encoder configured to extract a vector value from the speech data and a decoder configured to output the candidate text corresponding to the speech data from the vector value extracted by the encoder.

The speech recognition apparatus obtains, from the speech data, the candidate text including at least one word, a phonetic symbol sequence associated with a pronunciation of a word, or a combination thereof, using the speech recognition model. The at least one word may include at least one subword. The phonetic symbol sequence may be a transcription of a sequence of character symbols that is associated with a pronunciation of a word corresponding to a proper noun. The candidate text may further include an identifier pair indicating a start and an end of a phonetic symbol sequence. The identifier pair may include a start tag and an end tag to explicitly identify a portion corresponding to a phonetic symbol sequence. The identifier pair may indicate a category of a word corresponding to a phonetic symbol sequence to be identified by the identifier pair through an index.

In operation 530, the speech recognition apparatus determines whether a phonetic symbol sequence is present in the candidate text. In an example, the speech recognition apparatus determines whether a phonetic symbol sequence is present in the candidate text by verifying whether an identifier pair used to identify a phonetic symbol sequence is present in the candidate. In operation 550, in response to a determination that the phonetic symbol sequence is not present in the candidate text, the speech recognition apparatus determines the candidate text to be a target text.

In operation 540, in response to a determination that the phonetic symbol sequence is present in the candidate text, the speech recognition apparatus replaces or changes the phonetic symbol sequence in the candidate text with a word corresponding to the phonetic symbol sequence. In an example, the speech recognition apparatus replaces a phonetic symbol sequence identified by an identifier pair in the candidate text with a word corresponding to the phonetic symbol sequence.

To determine the word corresponding to the phonetic symbol sequence, the speech recognition apparatus may use dictionary data including information associated with pre-defined words and a phonetic symbol sequence corresponding to each of the words. The speech recognition apparatus may verify whether a word corresponding to the phonetic symbol sequence included in the candidate text is present in the dictionary data. The verifying may include retrieving a phonetic symbol sequence corresponding to the phonetic symbol sequence in the candidate text from phonetic symbol sequences included in the dictionary data, and identifying a word corresponding to the retrieved phonetic symbol sequence.

In an example, the dictionary data may be of a trie or hashmap data structure. In this example, the speech recognition apparatus may use such a data structure of the dictionary data to retrieve a phonetic symbol sequence matching the phonetic symbol sequence in the candidate text from the phonetic symbol sequences included in the dictionary data, and determine a word corresponding to the retrieved phonetic symbol sequence to be the word corresponding to the phonetic symbol sequence in the candidate text. Using the dictionary data of the trie or hashmap data structure, it is possible to increase search efficiency in retrieving a word corresponding to a phonetic symbol sequence.

In another example, the speech recognition apparatus may retrieve a phonetic symbol sequence most similar to the phonetic symbol sequence in the candidate text from among the phonetic symbol sequences included in the dictionary data. The speech recognition apparatus may calculate a similarity between the phonetic symbol sequence in the candidate text and each of the phonetic symbol sequences included in the dictionary data, and determine a word corresponding to a phonetic symbol sequence having a greatest similarity among the calculated similarities of the phonetic symbol sequences included in the dictionary data to be the word corresponding to the phonetic symbol sequence in the candidate text. In this example, the similarity may be determined based on how similar the phonetic symbol sequences are to each other in terms of length and representation, and the like. In this example, an edit distance algorithm may be used to calculate the similarity.

Using the similarity between phonetic symbol sequences, it is possible to retrieve a most similar word, even though an accurate word is not determined due to an absence of a phonetic symbol sequence from the dictionary data that matches the phonetic symbol sequence in the candidate text, and thereby expand a search range.

In still another example, to retrieve the word corresponding to the phonetic symbol sequence in the candidate text, a method of retrieving a phonetic symbol sequence matching the phonetic symbol sequence in the candidate text from the dictionary data of the trie or hashmap data structure, and a method of retrieving the most similar phonetic symbol sequence based on the similarity between each of the phonetic symbol sequences included in the dictionary data and the phonetic symbol sequence in the candidate text may be used in combination.

In addition, the dictionary data may be provided as a plurality of sets of dictionary data in number based on each category. The dictionary data corresponding to different categories may include information associated with a phonetic symbol sequence corresponding to each of words in each of the categories. To determine the word corresponding to the phonetic symbol sequence included in the candidate text, the speech recognition apparatus may use dictionary data corresponding to a category of the identifier pair included in the candidate text, among the sets of dictionary data corresponding to the different categories. For example, when the category of the identifier pair included in the candidate text is for human names, the speech recognition apparatus may retrieve the word corresponding to the phonetic symbol sequence using dictionary data corresponding to the category of human names. As described, using the dictionary data for each category or type of a proper noun, it is possible to retrieve only corresponding or required dictionary data in a speech recognition process. The speech recognition apparatus may determine the word corresponding to the phonetic symbol sequence in the candidate text using corresponding dictionary data, and replace the phonetic symbol sequence in the candidate text with the determined word.

In operation 550, the speech recognition apparatus determines a target text corresponding to at least a portion of the speech data based on a result of the replacing performed in operation 540. In an example, the speech recognition apparatus determines, to be a final target text, a text obtained as a result of eliminating the identifier pair from the candidate text and replacing the phonetic symbol sequence identified by the identifier pair with the corresponding word.

In an example, when a phonetic symbol sequence which is a target for retrieval from the dictionary data corresponds to a plurality of words, the speech recognition apparatus obtains a plurality of candidate target texts by replacing the phonetic symbol sequence with each of the words in operation 540. The speech recognition determines a final target text among the candidate target texts in operation 550. In this example, the speech recognition apparatus calculates a score of each of the candidate target texts using an LM and determines, to be the target text, a candidate target text having a greatest score among the respective scores calculated for the candidate target texts. The score used herein may indicate a probability value or an expected value corresponding to each of the candidate target texts. For example, when a score of a candidate target text is 0.75, the score may indicate that a probability of the candidate target text corresponding to a portion of speech data, which is a target for current speech recognition, is 0.75 (relative value).

Through the operations described above, the speech recognition apparatus may recognize a word that is not present in training data or is not sufficiently learned or trained, and thus improve accuracy in speech recognition. For example, by adding, to dictionary data, information associated with a new word, for example, a newly-coined word, and a phonetic symbol sequence corresponding to the new word, it is possible to recognize the new word that is not learned or trained in a training or learning process.

FIG. 6 illustrates a flowchart illustrating an example of a speech recognition method.

Referring to FIG. 6, in operation 610, a speech recognition apparatus receives speech data which is a target for speech recognition. In operation 620, the speech recognition apparatus encodes the received speech data using a neural network-based encoder included in a speech recognition model. Through the encoding, a vector value corresponding to the speech data may be determined. For example, the speech data is input to the encoder, and the encoder outputs the vector value corresponding to the speech data by compressing information of the speech data.

In operation 630, the speech recognition apparatus performs decoding based on the vector value obtained as a result of the encoding. The speech recognition apparatus determines a candidate text corresponding to the speech data using a neural network-based decoder included in the speech recognition model. The candidate text may include at least one word and a phonetic symbol sequence, and an identifier pair to be used to identify a phonetic symbol sequence.

In operation 640, the speech recognition apparatus extracts a phonetic symbol sequence form the candidate text based on the identifier pair included in the candidate text. In operation 650, the speech recognition apparatus retrieves a word corresponding to the phonetic symbol sequence in the candidate text from dictionary data that defines a corresponding relationship between a phonetic symbol sequence and a word. The speech recognition apparatus retrieves a phonetic symbol sequence most similar to or corresponding to the phonetic symbol sequence in the candidate text among various phonetic symbol sequences included in the dictionary data, and identifies a word corresponding to the retrieved phonetic symbol sequence.

In operation 660, the speech recognition apparatus replaces the phonetic symbol sequence included in the candidate text with the word retrieved in operation 650. For example, when there is a plurality of words corresponding to the phonetic symbol sequence in the candidate text as a result of the retrieving performed using the dictionary data, the speech recognition apparatus may determine a plurality of candidate target texts by replacing the phonetic symbol sequence with each of the words.

In operation 670, the speech recognition apparatus determines a target text based on a result of the replacing performed in operation 660. When there is a single word corresponding to the phonetic symbol sequence in the candidate text and a single candidate target text is determined, the speech recognition apparatus may determine the candidate target text to be a final target text. However, when there is a plurality of words corresponding to the phonetic symbol sequence in the candidate text and a plurality of candidate target texts is determined, the speech recognition apparatus may calculate a score of each of the candidate target texts using an LM, and select the final target text from among the candidate target texts based on the calculated scores of the candidate target texts. For example, a candidate target text having a greatest score among the calculated scores of the candidate target texts may be selected to be the final target text.

Figure 7:
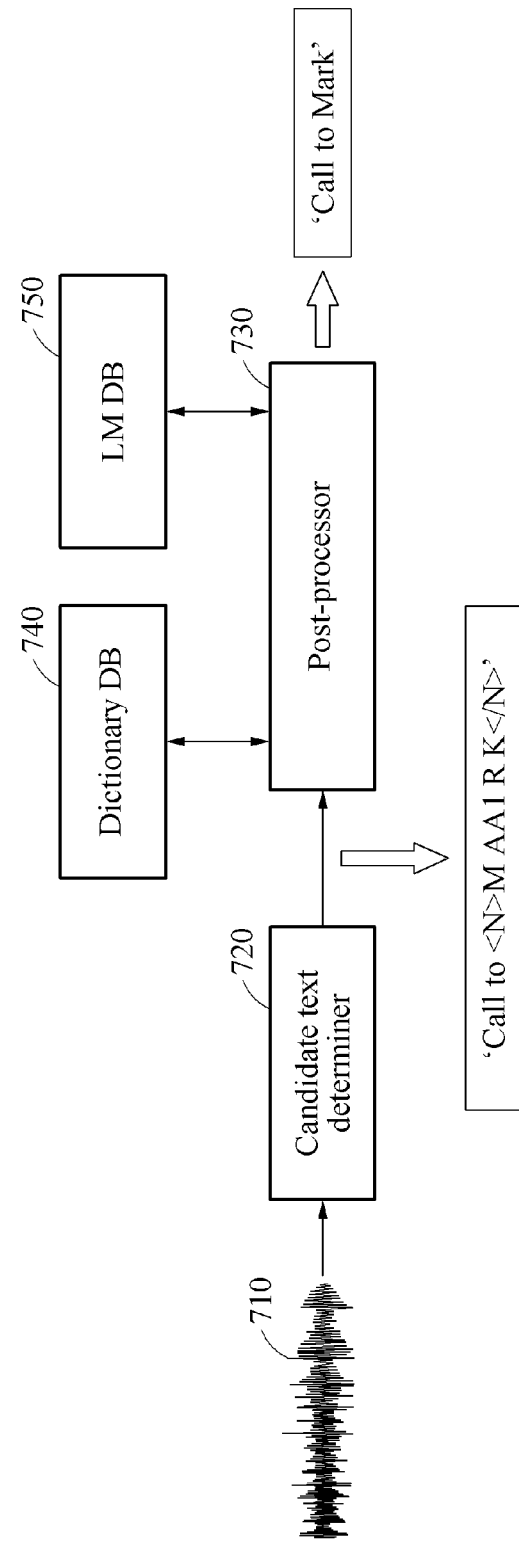
FIG. 7 illustrates an example of speech recognition.

FIG. 7 illustrates an example of speech recognition.

Referring to FIG. 7, speech data 710, which is a target to be recognized in speech recognition, is transferred to a speech recognition apparatus. The speech recognition apparatus includes a candidate text determiner 720 including an encoder-decoder based speech recognition model, and a post-processor 730 configured to post-process a candidate text output from the candidate text determiner 720.

In an example, the candidate text determiner 720 outputs a candidate text including a word, a phonetic symbol sequence, and an identifier pair used to identify a phonetic symbol sequence, using the speech recognition model. For example, the candidate text is output in a form of "'Call to <N>M AA1 R K</N>" from the candidate text determiner 720. In this example, "Call" and "to" correspond to respective words, "M AA1 R K" corresponds to a phonetic symbol sequence, and <N> and <IN> indicate an identifier pair.

The post-processor 730 replaces the phonetic symbol sequence in the candidate text with a corresponding word using dictionary data. The dictionary data may be of a trie or hashmap data structure, or a form of a table, and include information associated with a pair of a word and a phonetic symbol sequence. The post-processor 730 may retrieve the word corresponding to the phonetic symbol sequence in the candidate text through retrieval of a corresponding phonetic symbol sequence from the dictionary data or similarity-based retrieval based on a form of phonetic symbol sequence. The dictionary data, which is stored in a dictionary DB 740, may be updated when information associated with a new word and a phonetic symbol sequence corresponding to the new word is applied.

The post-processor 730 determines a final target text corresponding to the speech data 710 based on a result of the replacing. For example, the target text corresponding to the candidate text "Call to <N>M AA1 R K</N>" may be "Call to Mark."

In another example, the candidate text output from the candidate text determiner 720 includes a plurality of phonetic symbol sequences, for example, "I met <N>M AA1 R K</N> at <P>AE1 P AH0 L B IY2 Z</P> yesterday," and categories of the included phonetic symbol sequences may be different from each other. It is defined in advance that an identifier pair <N>, <IN> indicates a phonetic symbol sequence corresponding to a human name, and an identifier <P>, </P> indicates a phonetic symbol sequence indicating a POI. In this example, the post-processor 730 identifies a category of a phonetic symbol sequence based on an index, for example, N and P, indicated in an identifier pair. As described above, an identifier pair indicating a category of a phonetic symbol sequence may define a search range of a word, and thus enable rapid retrieval of a word corresponding to the phonetic symbol sequence.

In an example, the post-processor 730 retrieves a word corresponding to each phonetic symbol sequence using the dictionary data corresponding to a category of a phonetic symbol sequence, and replaces each phonetic symbol sequence with the retrieved word. For example, using dictionary data corresponding to a category of human names, the phonetic symbol sequence "M AA1 R K" is replaced with a corresponding word "Mark." In addition, using dictionary data corresponding to a category of POIs, the phonetic symbol sequence "AE1 P AH0 L B IY2 Z" is replaced with a corresponding word "Applebees." Based on such results of the replacing, a target text "'I met Mark at Applebees yesterday" is determined.

To determine a target text, the post-processor 730 uses an LM stored in an LM DB 750. For example, when the phonetic symbol sequence included in the candidate text corresponds to a plurality of words, the post-processor 730 generates a plurality of candidate target texts by replacing the phonetic symbol sequence with each of the words, and calculates a score of each of the candidate target texts using an n-gram LM or a neural network-based LM. The post-processor 730 then determines, to be a final target text, a candidate target text having a greatest score among respective scores calculated for the candidate target texts.

FIG. 8 illustrates an example of dictionary data of a word and a phonetic symbol sequence.

Referring to FIG. 8, dictionary data includes information associated with a plurality of words and a phonetic symbol sequence corresponding to each of the words. In the dictionary data, a pair of a word and a corresponding phonetic symbol sequence may be defined in a form of a table. The dictionary data may be used to determine a word corresponding to a phonetic symbol sequence included in a candidate text in a speech recognition process. There may be a plurality of phonetic symbol sequences corresponding to a single word, or a plurality of words corresponding to a single phonetic symbol sequence. In addition, dictionary data may be present for each category. When the dictionary data is divided by each category and managed for each category, it is possible to improve search efficiency by defining a search range of a word to be retrieved based on an identifier pair indicating a category of a phonetic symbol sequence.

Figure 9:
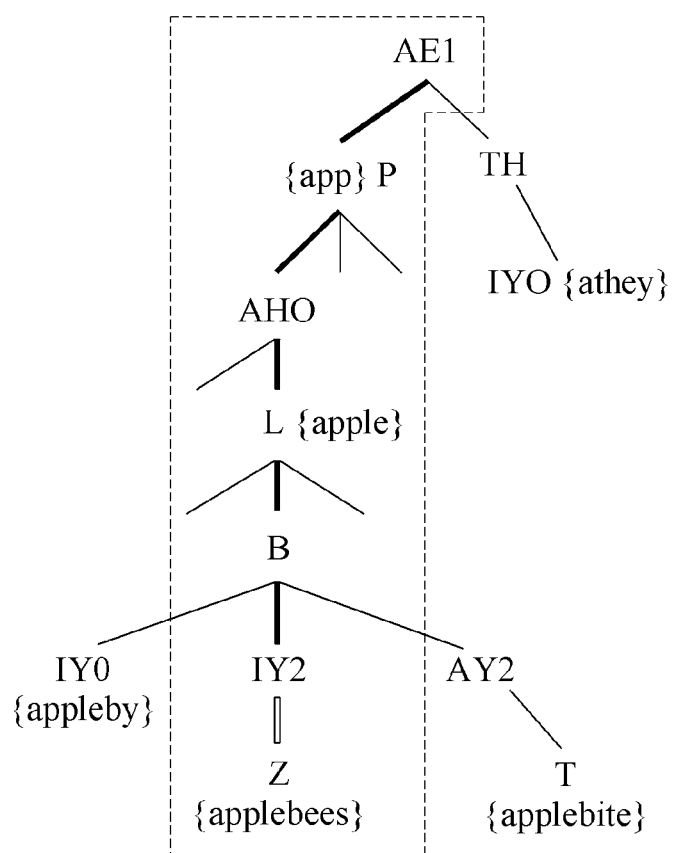
FIG. 9 illustrates an example of retrieving a word corresponding to a phonetic symbol sequence using a trie data structure.

FIG. 9 illustrates an example of retrieving a word corresponding to a phonetic symbol sequence using a trie data structure.

Referring to FIG. 9, dictionary data is embodied in a trie data structure. In the dictionary data, information associated with a relationship between a word and a phonetic symbol sequence may be stored in the trie data structure. For example, through the dictionary data represented in the trie data structure as illustrated, it is possible to rapidly retrieve a word "applebees" corresponding to a phonetic symbol sequence "AE1 P AH0 L B IY2 Z." A word corresponding to a phonetic symbol sequence in a candidate text may be rapidly retrieved through the dictionary data of the trie data structure, and thus search efficiency may be improved. The dictionary data may also be embodied in a hashmap data structure, in addition to the trie data structure. The dictionary data embodied in the trie or hashmap data structure may be used to retrieve a phonetic symbol sequence that matches the phonetic symbol sequence in the candidate text.

Figure 10:
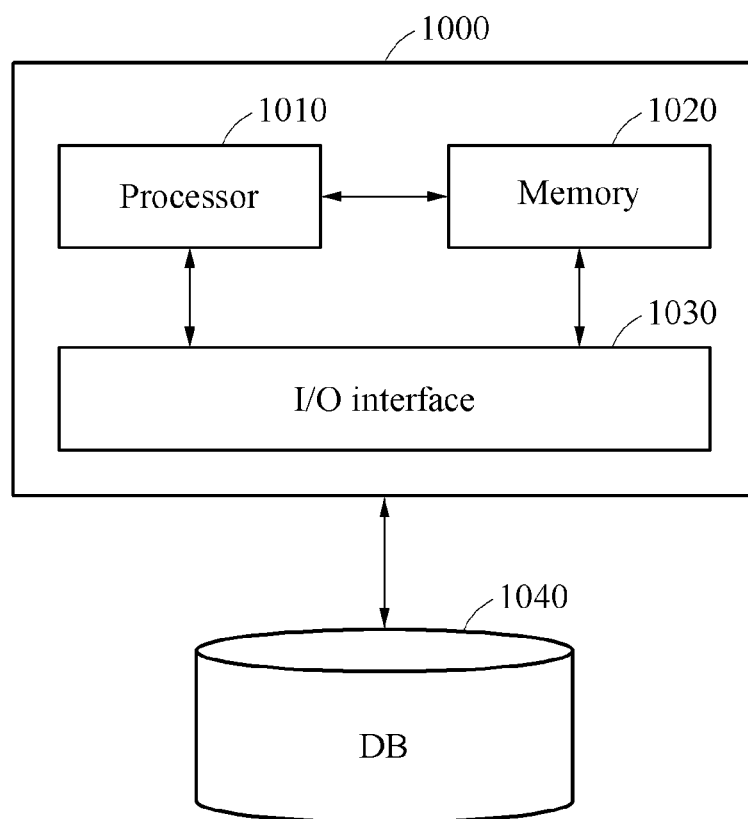
FIG. 10 illustrates an example of a speech recognition apparatus.

FIG. 10 illustrates an example of a speech recognition apparatus.

Referring to FIG. 10, a speech recognition apparatus 1000 includes at least one processor 1010, a memory 1020, and an input and output (I/O) interface (1030). The speech recognition apparatus 1000 may further include a DB 1040 configured to store at least one LM and/or dictionary data.

The I/O interface 1030 may include a voice interface, for example, a microphone, to receive a speech input or speech data. In addition, the I/O interface 1030 may include an input interface, for example, a keyboard, a touchscreen, and a touch pad, and an output interface of a display device to output a speech recognition result.

The memory 1020 may be connected to the processor 1010, and configured to store instructions implementable by the processor 1010, and data to be processed by the processor 1010 or data processed by the processor 1010. The memory 1020 may include, for example, a non-transitory computer-readable medium, for example, a high-speed random access memory (RAM) and/or a nonvolatile computer-readable storage medium (e.g., at least one storage device and flash memory device, and other solid-state memory devices).

The processor 1010 may control an overall operation of the speech recognition apparatus 1000, and execute functions and/or instructions to be performed in the speech recognition apparatus 1000. The processor 1010 may perform speech recognition based on speech data, and perform one or more operations or methods described above in relation to speech recognition with reference to FIGS. 1 through 9.

In an example, the processor 1010 receives speech data from the I/O interface 1030, and obtains a candidate text including at least one word and a phonetic symbol sequence associated with a pronunciation of a word from the received speech data using a speech recognition model. The processor 1010 determines a word corresponding to the phonetic symbol sequence using dictionary data including information associated with a plurality of words and a phonetic symbol sequence corresponding to each of the words, and replaces the phonetic symbol sequence in the candidate text with a word corresponding to the phonetic symbol sequence. The processor 1010 determines a target text corresponding to the speech data based on a result of the replacing. The dictionary data may be stored in the DB 1040, and changed or updated. In addition, the dictionary data may be present for each of different categories, and dictionary data of a new category may be added to the DB 1040.

The candidate text that is obtainable by the speech recognition model may further include an identifier pair used to identify a phonetic symbol sequence, in addition to a word and a phonetic symbol sequence. The processor 1010 determines the target text by replacing a phonetic symbol sequence identified by the identifier pair with a word corresponding to the phonetic symbol sequence.

In another example, there may be dictionary data of different categories including information associated with a phonetic symbol sequence corresponding to each of words in each of the categories. In this example, the processor 1010 determines a word corresponding to a phonetic symbol sequence, using dictionary data corresponding to a category identified by the identifier pair among sets of dictionary data respectively corresponding to the different categories. The processor 1010 then determines the target text by replacing the phonetic symbol sequence included in the candidate text with a corresponding word determined as described in the foregoing. The dictionary data of the different categories may be stored in the DB 1040.

In an example, the phonetic symbol sequence included in the candidate text may correspond to a plurality of words. In this example, the processor 1010 obtains a plurality of candidate target texts by replacing the phonetic symbol sequence with each of the words, and calculates a score of each of the candidate target texts using an LM. The score may indicate information of a probability of a candidate target text corresponding to a desired target text. The processor 1010 then determines the target text based on the calculated scores. For example, the processor 1010 determines, to be a final target text, a candidate target text having a greatest score among the calculated scores.

When the target text is determined as described above, the processor 1010 may extract a command of a user from the target text, and execute the extracted command.

The speech recognition apparatus, the training apparatus, and other apparatuses, devices, units, modules, and other components described herein with respect to FIGS. 1, 2, 7, and 10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 5, and 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A speech recognition method comprising:
   obtaining a speech recognition model by:
      detecting proper nouns from training data,
      replacing, using dictionary data corresponding to a category indicated by an identifier pair among sets of dictionary data corresponding to different categories, each proper noun with a phonetic symbol sequence associated with each proper noun to obtain preprocessed training data, and training the speech recognition model based on the preprocessed training data;

receiving speech data;

obtaining, from the received speech data and using the speech recognition model, a candidate text including at least one word, a phonetic symbol sequence associated with a pronunciation of a target word included in the received speech data, and the identifier pair, wherein the identifier pair indicates a start and an end of the phonetic symbol sequence, and the category of the target word;

determining a replacement word corresponding to the phonetic symbol sequence included in the candidate text, using the dictionary data corresponding to the category indicated by the identifier pair among the sets of dictionary data corresponding to the different categories;

replacing the phonetic symbol sequence with the replacement word; and determining a target text corresponding to the received speech data based on a result of the replacing, wherein each of the sets of dictionary data corresponding to the different categories comprises information associated with a phonetic symbol sequence corresponding to each of words in each of the categories.

2. The speech recognition method of claim 1, wherein the at least one word comprises at least one subword, and
the candidate text comprises the at least one subword, and the phonetic symbol sequence.

3. The speech recognition method of claim 2, wherein the replacing comprises:
replacing, with the replacement word, the phonetic symbol sequence identified by the identifier pair.

4. The speech recognition method of claim 1, further comprising:
determining the replacement word corresponding to the phonetic symbol sequence using dictionary data including information associated with a plurality of words and phonetic symbol sequences respectively corresponding to the words.

5. The speech recognition method of claim 4, further comprising:
calculating a similarity between the phonetic symbol sequence included in the candidate text and each of the phonetic symbol sequences included in the dictionary data; and
determining, as the replacement word corresponding to the phonetic symbol sequence included in the candidate text, a word corresponding to a phonetic symbol sequence having a greatest similarity among calculated similarities of the phonetic symbol sequences included in the dictionary data.

6. The speech recognition method of claim 4, wherein the dictionary data is of a trie or hashmap data structure, and the determining comprises:
retrieving a phonetic symbol sequence corresponding to the phonetic symbol sequence included in the candidate text from the phonetic symbol sequences included in the dictionary data, using the data structure; and
determining a word corresponding to the retrieved phonetic symbol sequence to be the replacement word corresponding to the phonetic symbol sequence included in the candidate text.

7. The speech recognition method of claim 1, further comprising:

obtaining a plurality of candidate target texts by replacing the phonetic symbol sequence with each of the words, in response to the phonetic symbol sequence corresponding to a plurality of words;

calculating a score of each of the candidate target texts using a language model; and determining, to be the target text, a candidate target text having a greatest score among calculated scores of the candidate target texts.

8. The speech recognition method of claim 1, wherein the phonetic symbol sequence is associated with a pronunciation of the target word corresponding to a proper noun.

9. The speech recognition method of claim 1, wherein the speech recognition model comprises:
an encoder configured to extract a vector value from the received speech data; and
a decoder configured to output the candidate text corresponding to the received speech data based on the vector value.

10. A non-transitory computer-readable storage medium storing instructions that, when executed by a processor, cause the processor to perform the speech recognition method of claim 1.

11. A speech recognition apparatus comprising: a processor configured to:
obtain a speech recognition model by:
detecting proper nouns from training data,
replacing, using dictionary data corresponding to a category indicated by an identifier pair among sets of dictionary data corresponding to different categories, each proper noun with a phonetic symbol sequence associated with each proper noun to obtain preprocessed training data, and
training the speech recognition model based on the preprocessed training data;

receive speech data;

obtain, from the received speech data and using the speech recognition model, a candidate text including at least one word, a phonetic symbol sequence associated with a pronunciation of a target word included in the received speech data, and the identifier pair, wherein the identifier pair indicates a start and an end of the phonetic symbol sequence and the category of the target word;

determine a replacement word corresponding to the phonetic symbol sequence using the dictionary data corresponding to the category indicated by the identifier pair among the sets of dictionary data respectively corresponding to the different categories;

replace the phonetic symbol sequence with the replacement word; and determine a target text corresponding to the received speech data based on a result of the replacing, wherein each of the sets of dictionary data corresponding to the different categories comprises information associated with a phonetic symbol sequence corresponding to each of words in each of the categories.

12. The speech recognition apparatus of claim 11, wherein the at least one word comprises at least one subword, and
the candidate text comprises the at least one subword, the phonetic symbol sequence.

13. The speech recognition apparatus of claim 12, wherein the processor is further configured to:
replace, with the replacement word, the phonetic symbol sequence identified by the identifier pair.

14. The speech recognition apparatus of claim 11, wherein the processor is further configured to:

determine the replacement word corresponding to the phonetic symbol sequence, using dictionary data including information associated with a plurality of words and a phonetic symbol sequence corresponding to each of the words.

15. The speech recognition apparatus of claim 11, wherein the processor is further configured to:

obtain a plurality of candidate target texts by replacing the phonetic symbol sequence with each of the words, in response to the phonetic symbol sequence corresponding to a plurality of words;

calculate a score of each of the candidate target texts using a language model; and determine, to be the target text, a candidate target text having a greatest score among calculated scores of the candidate target texts.

16. A speech recognition method comprising:

obtaining a speech recognition model by:

detecting proper nouns from training data, replacing, using dictionary data corresponding to a category indicated by an identifier pair among sets of dictionary data corresponding to different categories, each proper noun with a phonetic symbol sequence associated with each proper noun to obtain preprocessed training data, and training the speech recognition model based on the preprocessed training data;

receiving speech data;

obtaining, from the received speech data and using the speech recognition model, a target phonetic symbol sequence that represents a pronunciation of a target word included in the received speech data and the identifier pair indicates a start and an end of the target phonetic symbol sequence and the category of the target word;

determining a replacement word corresponding to the phonetic symbol sequence included in the candidate text, using the dictionary data corresponding to the category indicated by the identifier pair among the sets of dictionary data corresponding to the different categories; and outputting a target text corresponding to the received speech data by replacing the target word with the replacement words, based on the determining, wherein each of the sets of dictionary data corresponding to the different categories comprises information associated with a phonetic symbol sequence corresponding to each of words in each of the categories.

17. The speech recognition method of claim 16, further comprising determining the replacement word to replace the target word as one of the respective replacements words that is associated with one of the other phonetic symbol sequences that is most similar to the target phonetic symbol sequence.

18. The speech recognition method of claim 16, wherein the target phonetic symbol sequence is included in candidate text comprising at least one subword that precedes or follows the target phonetic symbol sequence.

19. The speech recognition method of claim 18, wherein the identifier pair comprises a first character that indicates a start of the target phonetic symbol sequence and a second character that that indicates an end of the target phonetic symbol sequence, and the at least one subword is separated from the target phonetic symbol sequence in the candidate text by one or both of the first character and the second character.

* * * * *